(12) United States Patent
Kopp et al.

(10) Patent No.: US 11,720,134 B2
(45) Date of Patent: Aug. 8, 2023

(54) METHOD AND SYSTEM FOR PREDICTING POTENTIAL FUTURE ENERGY CONSUMPTION OF BUILT ENVIRONMENT

(71) Applicant: Conectric, LLC, San Diego (CA)

(72) Inventors: Phillip Kopp, San Diego, CA (US); Wolfgang Lukaschek, Mattersburg (AT)

(73) Assignee: Conectric, LLC, San Diego, CA (US)

( * ) Notice: Subject to any disclaimer, the term of this patent is extended or adjusted under 35 U.S.C. 154(b) by 398 days.

(21) Appl. No.: 15/184,896

(22) Filed: Jun. 16, 2016

(65) Prior Publication Data

US 2016/0370778 A1 Dec. 22, 2016

Related U.S. Application Data

(60) Provisional application No. 62/181,351, filed on Jun. 18, 2015.

(51) Int. Cl.
*G05F 1/66* (2006.01)
*G06F 16/9032* (2019.01)
*G06N 7/01* (2023.01)

(52) U.S. Cl.
CPC .......... *G05F 1/66* (2013.01); *G06F 16/90324* (2019.01); *G06N 7/01* (2023.01); *G05B 2219/42001* (2013.01)

(58) Field of Classification Search
CPC ............................... G05F 1/66; G06F 17/3097
USPC ...................................................... 702/57, 61
See application file for complete search history.

(56) References Cited

U.S. PATENT DOCUMENTS

| 9,057,746 | B1 | 6/2015 | Houlette et al. | |
|---|---|---|---|---|
| 9,286,582 | B2 | 3/2016 | Drees et al. | |
| 10,304,145 | B2 | 5/2019 | Loeb et al. | |
| 2002/0072868 | A1* | 6/2002 | Bartone | H02J 3/14 702/62 |
| 2004/0167677 | A1* | 8/2004 | Weiss | G06Q 40/04 700/291 |
| 2008/0082183 | A1 | 4/2008 | Judge | |
| 2009/0195349 | A1 | 8/2009 | Frader-Thompson et al. | |
| 2011/0066391 | A1* | 3/2011 | AbuAli | G06Q 10/06 702/61 |
| 2011/0072378 | A1 | 3/2011 | Nurminen | |
| 2011/0119042 | A1 | 5/2011 | Johnson et al. | |

(Continued)

OTHER PUBLICATIONS

The Authoritative Dictionary of IEEE Standards Terms, 7th Ed. (2000), p. 46 (Year: 2000), IEEE Press, New York, 3 pages.

*Primary Examiner* — Eman A Alkafawi
(74) *Attorney, Agent, or Firm* — Procopio, Cory, Hargreaves & Savitch LLP (57) ABSTRACT

The present disclosure provides a method and system for predicting a potential future energy consumption of a plurality of energy loads in a built environment. The method includes a step of collecting a first set of statistical data associated with a plurality of energy consuming devices. The method includes another step of accumulating a second set of statistical data associated with each of a plurality of users present inside the built environment. The method includes yet another step of analyzing the first set of statistical data and the second set of statistical data. In addition, the method includes yet another step of predicting a set of predictions associated with the potential future energy consumption of each of the plurality of energy consuming devices.

20 Claims, 5 Drawing Sheets

(56) References Cited

U.S. PATENT DOCUMENTS

| | | | |
|---|---|---|---|
| 2012/0265586 A1* | 10/2012 | Mammone | G06Q 50/06 705/14.1 |
| 2014/0129160 A1 | 5/2014 | Tran | |
| 2016/0033985 A1* | 2/2016 | Gulli' | G05F 1/66 700/295 |
| 2016/0091912 A1* | 3/2016 | Stanlake | H02J 3/46 700/295 |
| 2016/0154389 A1* | 6/2016 | Drees | G06Q 10/06 700/291 |
| 2016/0247164 A1 | 8/2016 | Salajegheh et al. | |

\* cited by examiner

METHOD AND SYSTEM FOR PREDICTING POTENTIAL FUTURE ENERGY CONSUMPTION OF BUILT ENVIRONMENT

CROSS-REFERENCE TO RELATED APPLICATIONS

This application claims the benefit under 35 U.S.C. § 119(e) of U.S. Provisional Patent Application Ser. No. 62/181,351, filed Jun. 18, 2015 and entitled "SYSTEM AND METHOD FOR A DISTRIBUTED APPROACH TO DATA COLLECTION AND DISPLAY TO DEVELOP A PERSISTENT ENERGY MODEL WHICH INCLUDES MOVABLE AND FIXED ENERGY CONSUMING LOAD SOURCES AND ESTABLISHES A REFERENCE OF DISAGGREGATED ENERGY CONSUMPTION OF SPECIFIC APPLIANCES AND LOADS IN A BUILT ENVIRONMENT", the disclosure of which is herein incorporated by reference.

TECHNICAL FIELD

The present invention related to a field of energy management systems. More specifically, the present invention relates to prediction of potential energy consumption for different facilities.

BACKGROUND

With the advent in technological advancements over the past few decades, there has been an exponential rise in the number of large facilities. These facilities are big residential complexes, commercial offices, shopping centers and the like. The energy consumption of these facilities is usually very high. These large facilities include many electrical and mechanical devices which require huge amount of electrical power. A slight increase or decrease in the energy consumption of these facilities makes a huge impact commercially. In general, a consistent check on the energy consumption pattern in these large facilities is maintained.

Most of the owners/administrators of these facilities try to address the issue of inefficient energy usage by using the existing energy consumption prediction systems. In general, these existing prediction systems analyze, compare and regressively obtain results to measure energy consumption trend and energy consumption behavior. The current prediction systems are inefficient in delivering results that scale with current infrastructure. These existing systems do not provide real time reporting of the analysis, results and prediction. Further, these existing systems do not consider the energy consumption pattern of the users associated with the facility. Further, the data collection methods of these systems are archaic and offer a little scope of covering each of the devices present in electrical and mechanical systems of the facility.

In addition, a proper communication and feedback control system is either limited or absent in these systems. This leads to cost escalation and frequent manual maintenance of electrical and mechanical systems, thus employing bulk of users. The gains achieved through the use of one improvement are cannibalized by losses from the result impact of another load. This problem is enhanced even further by the fact that built environment occupants, its uses and other operational factors change over time. These changes are not taken into account while predicting the energy consumption inside these facilities. The users have no idea about which energy consuming devices consume most of the energy which does not provision the users to effectively reduce the energy costs.

In light of the above stated discussion, there is a need for a method and system that overcomes the above stated disadvantages.

SUMMARY

In one aspect, the present disclosure provides a method for predicting a potential future energy consumption of a plurality of energy loads in a built environment. The method includes a step of collecting a first set of statistical data associated with a plurality of energy consuming devices. The method includes another step of accumulating a second set of statistical data associated with each of a plurality of users present inside the built environment. The method includes yet another step of analyzing the first set of statistical data and the second set of statistical data. In addition, the method includes yet another step of predicting a set of predictions associated with the potential future energy consumption of each of the plurality of energy consuming devices. The prediction is derived by adding a multiplication factor to an estimated residual standard deviation for each pre-defined bin of time. Further, the first set of statistical data includes a current energy consumption data and a past energy consumption data associated with each of the plurality of energy consuming devices. The first set of statistical data is collected based on a first plurality of parameters. The first set of statistical data is collected in real time. The second set of statistical data is accumulated based on a second plurality of parameters and the second set of statistical data is accumulated in the real time. Moreover, the analysis of the first set of statistical data and the second set of statistical data includes one or more steps. The one or more steps include a step of aggregating the current energy consumption data of the first set of statistical data for the plurality of energy consuming devices into pre-defined bins of time. The one or more steps include another step of imputing one or more missing data points in an aggregated current energy consumption data. The aggregated current energy consumption data is imputed by utilizing local polynomial interpolation. The one or more steps include yet another step of estimating a residual standard deviation of the aggregated current energy consumption data for each pre-defined bin of time. The first set of statistical data and the second set of statistical data are analyzed for determination of a maximum consumption potential value of the built environment. The analysis of the first set of statistical data and the second set of statistical data generates a plurality of statistical results. Moreover, the set of predictions are predicted in the real time.

In an embodiment of the present disclosure, the method includes yet another step of updating the first set of statistical data, the second set of statistical data, the plurality of statistical results and the set of predictions.

In an embodiment of the present disclosure, the method includes yet another step of storing the first set of statistical data, the second set of statistical data, the plurality of statistical results and the set of predictions.

In an embodiment of the present disclosure, the set of predictions includes a maximum energy consumption values for each pre-defined time bin. The set of predictions are factored based on temperature, cost, a real time occupancy pattern, a date and a time period associated with operation of each of the plurality of energy consuming devices. In addition the set of predictions are factored based on unusual and unexpected energy behaviors in the energy consumption of each of the plurality of energy consuming devices, the correlation of energy demand and the energy consumption.

In an embodiment of the present disclosure, the method includes yet another step of displaying the first set of statistical data, the second set of statistical data and the plurality of statistical results on one or more statistical monitoring devices. In addition, the set of predictions are displayed on the one or more statistical monitoring devices.

In an embodiment of the present disclosure, the plurality of statistical results includes one or more graphs, one or more charts, one or more tables and one or more statistical maps of the energy consumption as a function of duration of the operations. Further, the plurality of statistical results includes base-load, variable load, the cost of the operations, energy efficiency, the temperature, humidity and daylight. Furthermore, the plurality of statistical results includes the real time occupancy of the plurality of users inside the built environment and physical parameters of each of the plurality of energy consuming devices.

In an embodiment of the present disclosure, one or more data collecting devices installed in the built environment gather the first set of statistical data and the second set of statistical data.

In an embodiment of the present disclosure, the first plurality of parameters includes the current energy consumption data. The current energy consumption pertains to each of the plurality of energy consuming devices. Further, the first plurality of parameters includes a physical location and the duration of the energy usage by each of the plurality of energy consuming devices in the built environment. Furthermore, the plurality of parameters includes a seasonal variation in the energy consumption and an off-seasonal variation in the energy consumption.

In an embodiment of the present disclosure, the second plurality of parameters includes an occupancy behavior of the plurality of users and an energy consuming pattern associated with a corresponding energy consuming device associated with each of the plurality of users. In addition, the second plurality of parameters includes a physical location of the each of the plurality of users. Further, the second plurality of parameters include the duration of the energy usage associated with the corresponding energy consuming device associated with each of the plurality of users present in the built environment.

In an embodiment of the present disclosure, the past energy consumption data and weather conditions are obtained from a plurality of sources. The plurality of sources includes a plurality of external application programming interfaces and third party databases.

In an embodiment of the present disclosure, the collection of the first set of statistical data is done by one or more data collecting devices located in the built environment.

In another aspect, the present disclosure provides a computer system. The computer system includes one or more processors and a memory. The memory is coupled to the one or more processors. The memory is used to store instructions. The instructions in the memory when executed by the one or more processors cause the one or more processors to perform a method. The one or more processors perform the method for predicting a potential future energy consumption of a plurality of energy loads in a built environment. The method includes a step of collecting a first set of statistical data associated with a plurality of energy consuming devices. The method includes another step of accumulating a second set of statistical data associated with each of a plurality of users present inside the built environment. The method includes yet another step of analyzing the first set of statistical data and the second set of statistical data. In addition, the method includes yet another step of predicting a set of predictions associated with the potential future energy consumption of each of the plurality of energy consuming devices. The prediction is derived by adding a multiplication factor to an estimated residual standard deviation for each pre-defined bin of time. Further, the first set of statistical data includes a current energy consumption data and a past energy consumption data associated with each of the plurality of energy consuming devices. The first set of statistical data is collected based on a first plurality of parameters. The first set of statistical data is collected in real time. The second set of statistical data is accumulated based on a second plurality of parameters and the second set of statistical data is accumulated in the real time. Moreover, the analysis of the first set of statistical data and the second set of statistical data includes one or more steps. The one or more steps include a step of aggregating the current energy consumption data of the first set of statistical data for the plurality of energy consuming devices into pre-defined bins of time. The one or more steps include another step of imputing one or more missing data points in an aggregated current energy consumption data. The aggregated current energy consumption data is imputed by utilizing local polynomial interpolation. The one or more steps include yet another step of estimating a residual standard deviation of the aggregated current energy consumption data for each pre-defined bin of time. The first set of statistical data and the second set of statistical data are analyzed for determination of a maximum consumption potential value of the built environment. The analysis of the first set of statistical data and the second set of statistical data generates a plurality of statistical results. Moreover, the set of predictions are predicted in the real time.

In yet another aspect, the present disclosure provides a computer-readable storage medium. The computer readable storage medium enables encoding of computer executable instructions. The computer executable instructions when executed by at least one processor perform a method. The at least one processor performs the method for predicting a potential future energy consumption of a plurality of energy loads in a built environment. The method includes a step of collecting a first set of statistical data associated with a plurality of energy consuming devices. The method includes another step of accumulating a second set of statistical data associated with each of a plurality of users present inside the built environment. The method includes yet another step of analyzing the first set of statistical data and the second set of statistical data. In addition, the method includes yet another step of predicting a set of predictions associated with the potential future energy consumption of each of the plurality of energy consuming devices. The prediction is derived by adding a multiplication factor to an estimated residual standard deviation for each pre-defined bin of time. Further, the first set of statistical data includes a current energy consumption data and a past energy consumption data associated with each of the plurality of energy consuming devices. The first set of statistical data is collected based on a first plurality of parameters. The first set of statistical data is collected in real time. The second set of statistical data is accumulated based on a second plurality of parameters and the second set of statistical data is accumulated in the real time. Moreover, the analysis of the first set of statistical data and the second set of statistical data includes one or more steps. The one or more steps include a step of aggregating the current energy consumption data of the first set of statistical data for the plurality of energy consuming devices into pre-defined bins of time. The one or more steps include another step of imputing one or more missing data points in an aggregated current energy consumption data. The aggregated current energy consumption data is imputed by utilizing local polynomial interpolation. The one or more steps include yet another step of estimating a residual standard deviation of the aggregated current energy consumption data for each pre-defined bin of time. The first set of statistical data and the second set of statistical data are analyzed for determination of a maximum consumption potential value of the built environment. The analysis of the first set of statistical data and the second set of statistical data generates a plurality of statistical results. Moreover, the set of predictions are predicted in the real time.

BRIEF DESCRIPTION OF THE FIGURES

Having thus described the invention in general terms, reference will now be made to the accompanying drawings, which are not necessarily drawn to scale, and wherein:

DETAILED DESCRIPTION

In the following description, for purposes of explanation, numerous specific details are set forth in order to provide a thorough understanding of the present technology. It will be apparent, however, to one skilled in the art that the present technology can be practiced without these specific details. In other instances, structures and devices are shown in block diagram form only in order to avoid obscuring the present technology.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

Figure 1:
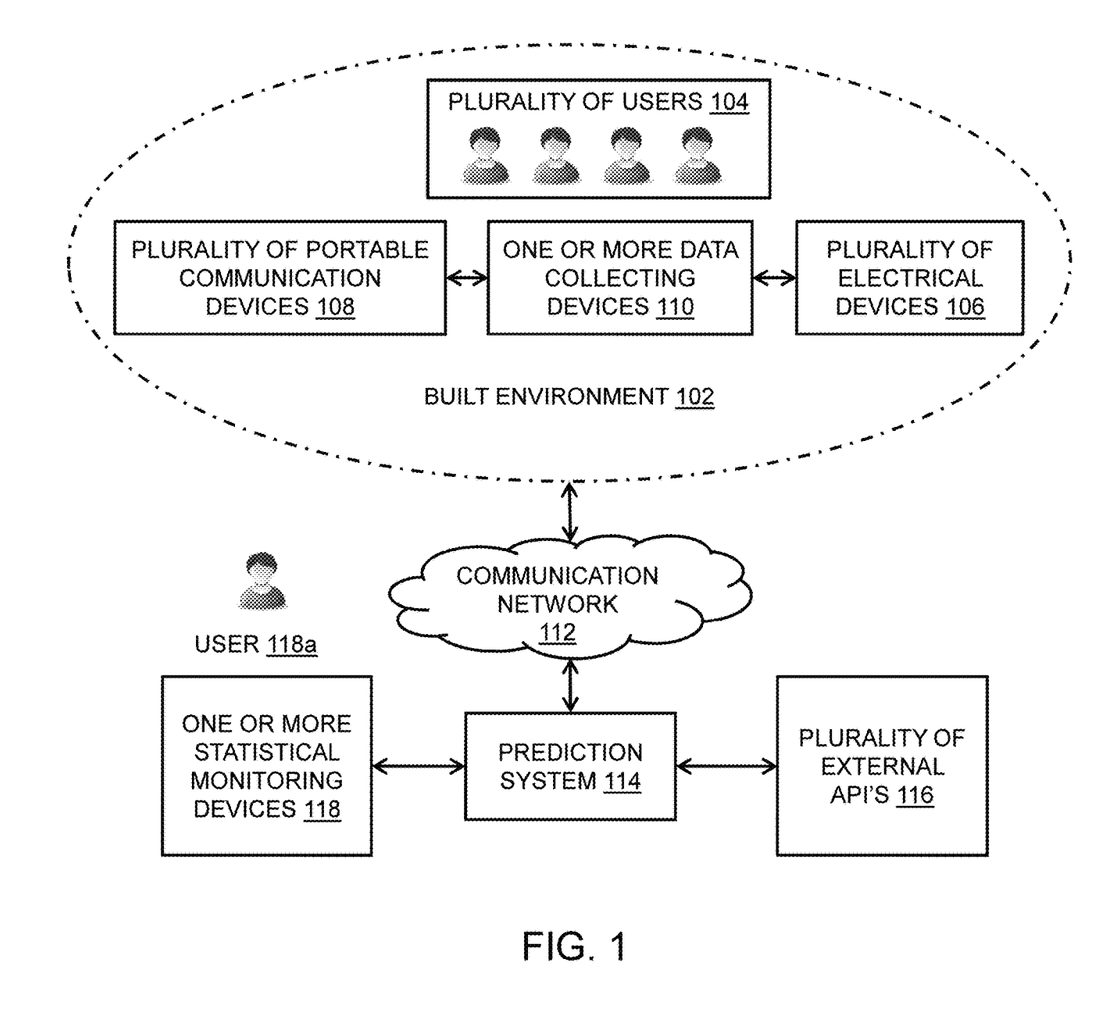
FIG. 1 illustrates an interactive environment for predicting a potential future energy consumption of a plurality of energy loads in a built environment, in accordance with various embodiments of the present disclosure.

FIG. 1 illustrates an interactive environment for predicting a potential future energy consumption of a plurality of energy loads in a built environment 102, in accordance with various embodiments of the present disclosure. The plurality of energy loads is located in the built environment 102. The interactive environment facilitates collection, accumulation and analysis of a first set of statistical data associated with each of a plurality of energy consuming devices. In addition, the interactive environment facilitates collection, accumulation and analysis of a second set of statistical data associated with each of a plurality of users 104. The first set of statistical data and the second set of statistical data for utilized to obtain an energy usage pattern of the built environment 102.

The analysis of the first set of statistical data and the second set of statistical data results into generation of a set of predictions. The set of predictions lead to a sustainable energy and a cost efficient use of each of the plurality of energy consuming devices in the built environment 102. The interactive environment is characterized by the interaction of the built environment 102, a plurality of electrical devices 106, a plurality of portable communication devices 108, one or more data collecting devices 110, a communication network 112, a prediction system 114, a plurality of external application program interfaces 116 (hereafter "APIs") and one or more one or more statistical monitoring devices 118. In addition, the plurality of energy consuming devices includes the plurality of electrical devices 106 and the plurality of portable communication devices 108.

Furthermore, the built environment 102 utilizes energy for operations and maintenance of the built environment 102. The built environment 102 obtains the energy from a plurality of resources of energy. The plurality of resources of energy includes but may not be limited to solar energy, thermal energy, energy from gases and energy from water. In addition, each of the forms of the energy is utilized to produce electrical energy. The operation and maintenance of the built environment 102 are based on types of services provided by the built environment 102. The types of services include hospitality, travel, work, entertainment and the like. In addition, each type of service provided decides a scale of the operations and maintenance of the built environment 102. The type of services and the maintenance pertains to the energy consumption associated with each of the plurality of energy consuming devices. Examples of the built environment 102 include but may not be limited to an office, a mall, an airport, a stadium, a manufacturing plant and the like.

In addition, the built environment 102 is associated with a plurality of users 104 present inside the built environment 102. The plurality of users 104 may be any human operator, human worker, occupants, data manager, visitors and the like. Each of the plurality of users 104 is associated with a task. For example, the human operators perform the task of monitoring and regulating machines. In another example, the human workers perform the task of cleaning, sweeping and repairing. In yet another example, the occupants are the employees that include managers, attendants, assistants, clerk, security staff and the like. In yet another example, the visitors are civilians present for a specific period of time.

Each user of the plurality of users 104 utilizes a portion of energy based on a plurality of factors. The plurality of factors is associated with a corresponding energy consuming device of the plurality of energy consuming devices. The pre-determined criterion includes duration of use of each of the plurality of energy consuming devices. Further, the pre-determined criterion includes a type of applications of each of the plurality of energy consuming devices associated with each of the plurality of users 104. For example, spreadsheet editing consumes lower energy on a laptop as compared to a heavy game consuming a significant amount of the energy. In addition, each of the plurality of users 104 is associated with the energy consumption of the plurality of electrical devices 106. The plurality of electrical devices 106 is located inside the built environment 102. The plurality of electrical devices 106 may be electrical, electromechanical, fixed, portable, variable, related or unrelated to structure and the operations of the built environment 102.

Moreover, the energy consumption pertains to the plurality of electrical devices 106. The energy consumption is based on power rating and the duration of use of each of the plurality of the electrical devices 106. The plurality of electrical devices 106 includes but may not be limited to air conditioners, de-humidifiers, escalators, elevators and lightning devices. The energy consumption is determined by performing evaluation, storage and analysis of the plurality of factors associated with each of the plurality of electrical devices 106. The plurality of factors includes current, voltage, power, thermal loss, device size and power rating for each of the plurality of electrical devices 106.

Further, the plurality of factors is recorded for each of the plurality of energy consuming devices to obtain the first set of statistical data. In addition, the first set of statistical data is recorded based on a first plurality of parameters of the built environment 102. In addition, the first plurality of parameters includes the current energy consumption data. The current energy consumption pertains to each of the plurality of energy consuming devices. Further, the first plurality of parameters includes a physical location and the duration of the energy usage by each of the plurality of energy consuming devices in the built environment 102. Furthermore, the plurality of parameters includes a seasonal variation in the energy consumption and an off-seasonal variation in the energy consumption. In an embodiment of the present disclosure, the first set of statistical data is digitally collected through sensors. In another embodiment of the present disclosure, the energy prediction system 100 performs physical collection of the first set of statistical data.

In addition, the first set of statistical data includes a usage pattern derived from the information collected from each of the plurality of energy consuming devices. The usage pattern is stored and updated for benefit of each user of the plurality of users 104. For example, a photocopy machine may have a copy counter to show number of times an image is reproduced. In another example, a pump motor or factory motor may have a revolution counter or an hour counter to display the operating life. In yet another example, a building air conditioner may have a management computer or software system to record behavior and use for operator over a specific period of time.

In addition, the energy prediction system 100 segregates the first set of statistical data. The segregation is based on one or more operating characteristics and one or more physical characteristics associated with each of the plurality of energy consuming devices. The one or more operating characteristics includes an operating voltage, a running load amperage, a full load amperage, a wattage, a voltage, a frequency, the temperature, a flow rate and an operating range. The one or more physical characteristics include size, dimension, packaging and shape of each of the plurality of energy consuming devices present in the built environment 102.

Moreover, each of the plurality of users 104 is associated with a corresponding portable communication device of the plurality of portable communication devices 108 present inside the built environment 102. In addition, each of the plurality of portable communication devices 108 consumes a pre-defined amount of energy of the energy consumption.

In addition, the plurality of portable communication devices 108 includes laptops, mobile phones, PDA, tablets and the like. The energy prediction system 100 derives the pre-defined amount of the energy consumed by the each of the plurality of portable communication devices 108 that come and leave the built environment 102. The pre-defined amount of energy is derived based on the occupancy patterns of each of the plurality of users 104. For example, each user of the plurality of user 104 in a built environment 102 may arrive and leave the built environment 102 during certain hours each day. Each user carries a corresponding portable communication device both in and out of the built environment 102. Moreover, the occupancy pattern is recorded by separate systems such as time logs, entry systems, visitor logs, RFID tags or occupancy sensors inside the built environment 102.

Further, the energy usage is derived from information about the plurality of users 104 and time spent by each occupant in the built environment 102. The first set of statistical data is based on the first plurality of parameters and the second set of statistical data based on the second plurality of parameters. The first set of statistical data is transferred to the one or more data collecting devices 110. The one or more data collecting devices 110 is collects the first set of statistical data and the second set of statistical data. The one or more data collecting devices 110 perform digital collection and manual collection. The one or more data collecting devices 110 transfer the first set of statistical data and the second set of statistical data to the prediction system 114. Each of the one or more data collecting devices 110 is a portable device with an inbuilt API. The inbuilt API of each of the one or more data collection device 110 is associated with a Global Positioning system (hereafter "GPS") (as discussed in detailed description of FIG. 2). Further, the inbuilt API of each of the one or more data collection device 110 is associated a camera and keypad designed for manual data input from the plurality of users 104.

Moreover, the daily usage or operating characteristics of the plurality of energy consuming devices is derived in the real time. The daily usage is derived by interviewing each user of the plurality of users 104 associated with each of the one or more data collecting devices 110. Each user of the plurality of users 104 maintains the operations and records a pre-defined set of answers. The pre-defined set of answers pertains to a pre-defined set of questions associated with one or more operating characteristics and one or more physical characteristics. In addition, the second set of statistical data is obtained by interviewing each of the plurality of users 104. The second set of statistical data is assimilated and parsed using a statistical collection model. The statistical collection model typically joins information from a collection of different sources and ascertains a probability of accuracy. The statistical collection model compares different answers to same questions or different questions designed to arrive at same answer.

Furthermore, the one or more data collecting devices 110 is associated with the communication network 112 through an internet connection. The internet connection is established based on a type of network. In an embodiment of the present disclosure, the type of network is a wireless mobile network provided by an internet service provider. In another embodiment of the present disclosure, the type of network is a wired network with a finite bandwidth provided by the internet service provider. In yet another embodiment of the present disclosure, the type of network is a combination of the wireless and the wired network for the optimum throughput of data transmission. The communication network 112 includes a set of channels with each channel of the set of channels supporting a finite bandwidth.

Moreover, the finite bandwidth of each channel of the set of channels is based on a capacity of the communication network 112. The communication network 112 transmits a pre-determined size of the first set of statistical data and the second set of statistical data to the prediction system 114. Accordingly, the prediction system 114 receives the pre-determined size of the first set of statistical data and the second set of statistical data. In addition, the prediction system 114 receives another part of the first set of statistical data from the plurality of external APIs 116 and third party databases. The plurality of external APIs 116 and the third party databases are configured to collect, store and transmit weather history and weather forecasts.

Further, the plurality of external APIs 116 and the third party databases are configured to collect, store and transmit energy usage data, billing data, a past energy consumption data and metered energy data. Furthermore, the plurality of external APIs 116 and the third party databases are configured to collect, store and transmit financial or non-financial business data. The financial or non-financial business data comes from business management software. Example of the business management software includes Enterprise Resources Planning (ERP) software. In addition, the prediction system 114 requests the plurality of external APIs 116 for timed data polls. The timed data polls are requested in order to pull and push the part of the first set of statistical data. The timed data polls are programmed based on batch calendar scheduling, manual requests or real-time data feeds from on-site monitoring equipment.

Further, the prediction system 114 collects the segregated form of the first set statistical data. The prediction system 114 analyzes the segregated form of the first set of statistical data and the second set of statistical data. The analysis of the first set of statistical data is performed by aggregating a current energy consumption data for pre-defined bins of time, imputing one or more missing data points for each bin of time, estimating a residual standard deviation for each bin of time. Accordingly, the analysis of the first set of statistical data and the second set of statistical data provides a plurality of statistical results. The plurality of statistical results pertains to the energy consumption. In addition, the plurality of statistical results is based on a statistical data model. The statistical data model provides a complete insight into the energy consumption trend. The plurality of statistical results include a table and chart of monthly energy consumption of the built environment 102 and a table of a total monthly variable energy load.

In addition, the plurality of statistical results includes a statistical correlation between the energy consumption and the temperature for the data points cooling degree days and heating degree days. Further, the plurality of statistical results includes a pie chart to show a separation of the energy use in the built environment 102 and a table of energy consumption per month and air conditioner loads. Furthermore, the plurality of statistical results includes a statistical chart depicting a kWh consumption based on load type, a bar graph of expected air conditioner savings and rental cost. Also, the plurality of statistical results includes the statistical chart of total kWh consumed per room as a function of cold degree days.

Furthermore, the prediction system 114 displays each of the plurality of statistical results through an application installed in a mobile phone, tablet, smart watch and the like. In another embodiment of the present disclosure, the prediction system 114 displays each of the plurality of statistical results on a web page. In yet another embodiment of the present disclosure, the prediction system 114 displays each of the plurality of statistical results on a plurality of monitors. The plurality of statistical results obtained from the analysis of the first set of statistical data and the second set of statistical data is used as a reference basis of the energy consumption to predict future energy usage.

In addition, the prediction system 114 predicts the future energy usage by the set of predictions. For example, the temperature reference is adjusted to enable an average and mean temperature during month of July is adjusted up or down by several degrees Fahrenheit. The prediction system 114 displays a resulting change in the predicted use of energy based on the temperature forecast. In another example, the operating behavior of a specific device may change based on an adjustment of the occupancy patterns and the operations of the specific device. For example the typical occupant brings laptop computer for an average total of 170 hours per month into the building. Also, a discount factor of 15% is provided for the time at which the laptop is not plugged in or charging from the buildings electrical supply.

The prediction system 114 determines a relationship between a temperature based on seasonal conditions and the energy consumption inside the built environment 102. The relationship is determined by performing a mathematical analysis for determining the plurality of statistical results. Further, the prediction system 114 dynamically updates the plurality of statistical results in the real time based on the real time occupancy score and statistics inside the built environment 102.

Further, the prediction system 114 transfers the plurality of statistical results along with the set of predictions to the one or more one or more statistical monitoring devices 118. The plurality of statistical results pertains to energy consumption, cost, finances, loss and efficiency. The one or more one or more statistical monitoring devices 118 is configured to receive and display the first set of statistical data and the second set of statistical data. In addition, the one or more statistical monitoring devices 118 are configured to receive and display the plurality of statistical results and the set of predictions for proper monitoring and regulation. The one or more statistical monitoring devices 118 is a device capable of receiving the first set of statistical data and the second set of statistical data from the prediction system 114. Also, the one or more statistical monitoring devices 118 is a device capable of receiving the plurality of statistical results and the set of predictions from the prediction system 114.

Furthermore, the one or more statistical monitoring devices 118 are associated with a user 118*a*. The user 118*a* performs the monitoring and evaluation of the analysis of received first set of statistical data and the second set of statistical data. In addition, the user 118*a* performs the monitoring and evaluation of the plurality of statistical results and the set of predictions. The user 118*a* is designated to inform authorities about the changes required in the energy consumption. In addition, the user 118*a* adds other data required manually for the analysis of the statistical data collected from the built environment 102.

It may be noted that in FIG. 1, the prediction system 114 transfers the plurality of statistical results to the one or more statistical monitoring devices 118; however, those skilled in the art would appreciate that the prediction system 114 transfers the first set of statistical data, the second set of statistical data, the plurality of statistical results and the set of predictions to more number of statistical monitoring devices. In addition, it may be noted that in FIG. 1, the one or more statistical monitoring devices 118 is associated with the user 118*a*; however, those skilled in the art would appreciate that more number of one or more statistical monitoring devices are associated with more number of users.

Figure 2:
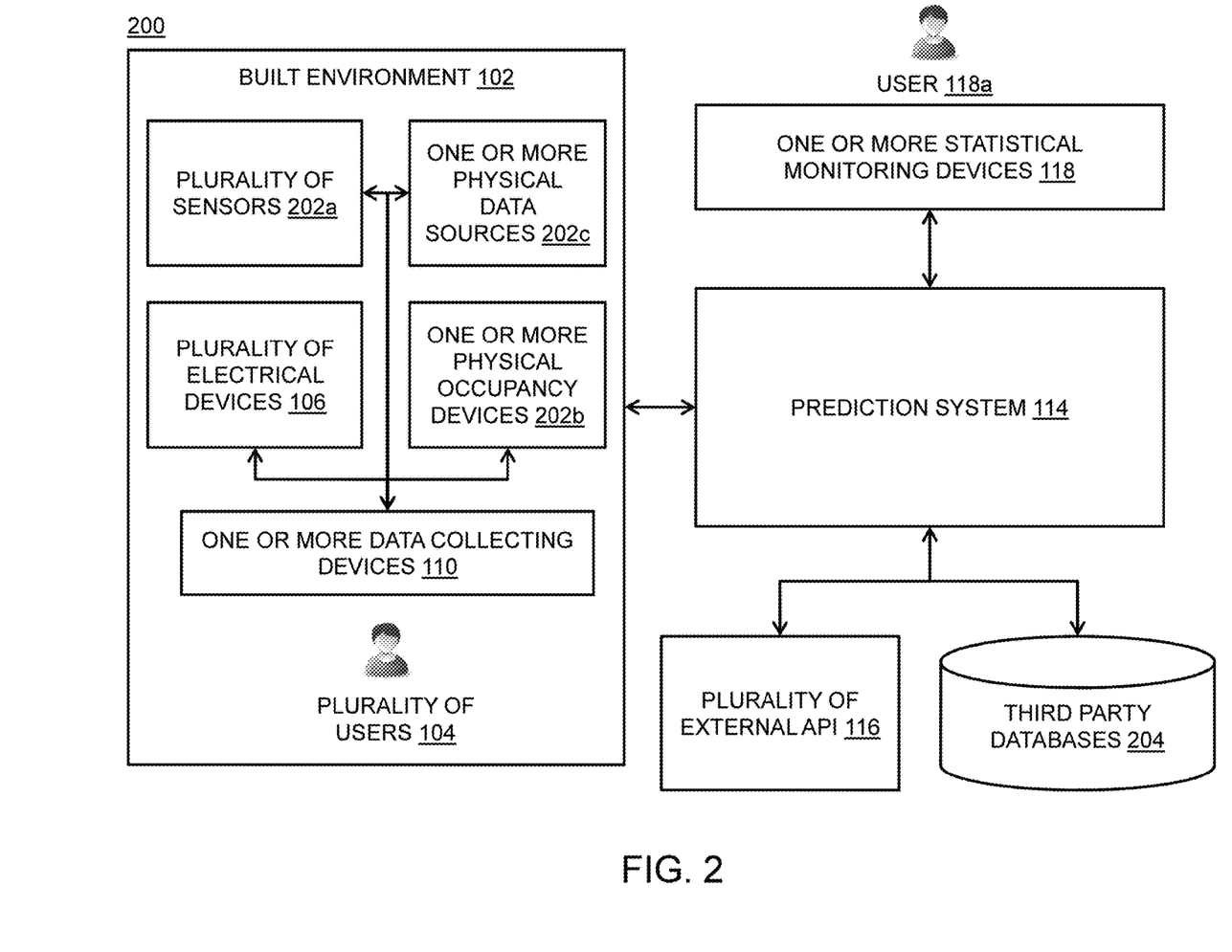
FIG. 2 illustrates a block diagram for predicting the potential future energy consumption of the plurality of energy loads in the built environment, in accordance with various embodiments of the present disclosure.

FIG. 2 illustrates a block diagram 200 for predicting the potential future energy consumption of the plurality of energy loads in the built environment 102, in accordance with various embodiments of the present disclosure. It may be noted that to explain the system elements of FIG. 2, references will be made to the system elements of the FIG. 1. The block diagram 200 illustrates a method to collect, accumulate and analyze the first set of statistical data associated with each of the plurality of energy consuming devices. In addition, the block diagram 200 illustrates a method to collect, accumulate and analyze and the second set of statistical data associated with each of the plurality of users 104.

Going further, the block diagram 200 includes the built environment 102, the prediction system 114, the plurality of external API's 116, third party databases 206 and the one or more statistical monitoring devices 118. Moreover, the built environment 102 includes the plurality of electrical devices 106, a plurality of sensors 202*a*, one or more physical occupancy devices 202*b*, one or more physical data sources 202*c* and the one or more data collecting devices 110. In addition, the plurality of electrical devices 106 and the plurality of portable communication devices 108 is the plurality of energy consuming devices. Further, the plurality of electrical devices 106 offers loads with a pre-defined amount of energy consumption. In addition, the energy consumption at the loads is the electrical energy. The energy consumption of each of the plurality of electrical devices 106 is based on the plurality of factors associated with the load ratings. The plurality of factors associated with each of the plurality of electrical devices 106 includes the voltage, the current, reactive power and active power. In addition, the plurality of factors associated with each of the plurality of electrical devices 106 includes the phase, the frequency, the temperature, device size, volume, stability and the like.

Further, the plurality of electrical devices 106 may be electrical, electromechanical, fixed, portable, variable, related or unrelated to structure and the operation of the built environment 102. The energy consumption at each of the loads is determined by the scale of the operation of each of the plurality of electrical devices 106. The energy consumption is determined by evaluating, comparing and calculating the plurality of factors associated with each of the plurality of electrical devices 106.

Further, the plurality of factors associated with each of the plurality of energy consuming devices is recorded to obtain the first set of statistical data (as stated above in the detailed description of the FIG. 1). In addition, the first set of statistical data is recorded based on a first plurality of parameters of the built environment 102. Furthermore, the energy prediction system 100 utilizes a method which records the first set of statistical data from each of the plurality of electrical devices 106. In an embodiment of the present disclosure, the method records the first set of statistical data associated with each of the plurality of electrical devices 106. The method performs digital collection of the first set of statistical data.

In addition, the digital collection of the first set of statistical data includes installations of digital meters, digital current and voltage sensors, multi-meters, watt-meters, supervisory control and data acquisition (SCADA). The first set of statistical data recorded is obtained in the real time at a pre-defined interval of time. In another embodiment of the present disclosure, the method performs physical collection of the first set of statistical data.

Furthermore, the physical collection of the first set of statistical data is performed by interviewing the plurality of users 104 associated with the monitoring and the operation of the plurality of electrical devices 106. In an embodiment of the present disclosure, the energy consumption pertains to the one or more operating characteristics of the plurality of electrical devices 106. The energy consumption is derived from a control system, timer, computer or relay to derive.

The second set of statistical data is recorded in the real time. The second set of statistical data is recorded based on the occupancy pattern and the energy consumption behavior of each of the plurality of users 104. Each of the plurality of users 104 utilizes resources inside the built environment 102 to consume a pre-determined amount of the energy. The pre-determined amount of the electrical energy is based on the type of the resource used. In an embodiment of the present disclosure, the resource is a fixed mechanical or electrical service provided by the built environment 102. An example of such resource includes but may not be limited to the air conditioners, the escalators, the elevators and the lightning devices. For example, the electrical energy consumed by the air conditioners is dependent on relative temperature difference between body of each of the plurality of users 104 and an ambient temperature.

In an example, the electrical energy consumed by the elevator or the escalator is based on weight of the plurality of users 104. The weight of the plurality of users 104 affects driving power of electric motor which increases the energy consumption. In another example, The electrical energy consumed by the elevators is based on number of trips. In addition, the number of trips of the elevator decides the demand of the elevator. Moreover, the demand of the elevator is based on the physical occupancy of the plurality of users 104 present on a floor of plurality of floors of the built environment 100. Further, the built environment 100 with the lower physical occupancy on a first floor of the plurality of floors has the lower demand of the elevator. The built environment 102 with the higher physical occupancy on a second floor has the higher demand of the elevators. In another embodiment of the present disclosure, the resource is the plurality of portable communication devices 108 associated with each of the plurality of users 104. Example of the plurality of portable communication devices 108 include but may not be limited to the mobile phone, the personal digital assistants (hereafter "PDA") and the laptop. Each portable communication device consumes a pre-defined amount of the electrical energy based on the plurality of factors.

Moreover, the usage of the portable communication devices is derived from the information about the plurality of users 104 carrying the portable communication device.

For example, the office worker may bring the laptop or computer to the office each day and carry it home each night. The use of the laptop or the computer within the office is derived by looking at the office worker time stamped schedule. Further, the use is derived by multiplying the time with the plurality of factors associated with each of the plurality of electrical devices 106.

In addition, the changes in the energy consumption of the portable communication device is recorded based on age or purpose to derive the second set of statistical data. In an example, an amount of the energy consumption for the laptop operating with heavy graphics design programs is different from the laptop used simply for an email or a word processing function. Further, each of the plurality of users 104 determines average energy consumption. The average energy consumption pertains to each of the energy consuming devices present inside the built environment 102. In addition, number of the plurality of users 104 present inside the built environment 102 varies based on day, month, season, events and time of year.

In addition, the real time occupancy of the plurality of users 104 is determined by utilizing the one or more physical occupancy devices 202b. The one or more physical occupancy devices 202b works by enable an occupancy sensing network for recording the real time occupancy of each of the plurality of users 104. Examples of the one or more physical occupancy devices 202b includes but may not be limited to radio frequency identification (RFID) tags, time logs, entry system, visitor logs and occupancy sensors. The one or more physical occupancy devices 202b identify each of the plurality of users 104 by accessing details of a corresponding portable communication device of the plurality of portable communication devices 108. In addition, the one or more physical occupancy devices 202b tracks the transmission location of the voice or data over the network. The information associated with track data is used can be used to obtain the physical location of each of the plurality of users 104.

Furthermore, the ambient parameters are recorded under the second set of statistical data. The ambient parameters affects the duration of the energy consumption and the real time occupancy of the plurality of users 104. The plurality of sensors 202a is utilized to record the ambient parameters. The plurality of sensors 202a includes a temperature sensor, a humidity sensor, a pressure sensor, a sound sensor, a vibration sensor and the like. In addition, the first set of statistical data includes a portion of data that is not feasible for any electronic sensor or device to obtain the manual input from the one or more physical data sources 202c. The one or more physical data sources 202c include interview forms, bills, digital photographs and the like.

Further, the one or more physical data sources 202c are obtained through the use of the one or more data collecting devices 110. The one or more data collecting devices 110 performs digital collection and manual collection of the first set of statistical data and the second set of statistical data. Accordingly, the one or more data collecting devices 110 transfers the first set of statistical data and the second set of statistical data to the prediction system 114. Each of the one or more data collecting devices 110 is a portable device with an inbuilt application program interface (hereinafter "API") (as elaborated above in the detailed description of the FIG. 1). The one or more collecting devices 110 are associated with the network through the internet connection. The internet connection is established based on the type of the network (as previously described in the detailed description of the FIG. 1). The network is configured to transmit the pre-determined size of the first set of statistical data and the second set of statistical data at the pre-defined rate to the prediction system 114. The prediction system 114 derives the probabilistic score for providing the improvement in the energy consumption of the built environment 102.

The collection of the first set of statistical data and the second set of statistical data is performed through a distributed audit process. The distributed audit process enables collection and analysis of the first set of statistical data and the second set of statistical data corresponding each of the plurality of energy consuming devices and each of the plurality of users 104. In addition, the distributed audit process is applicable for data collection across multiple platforms. The distributed audit process when divided up across a distributed digital platform enables cost effective and relatively faster means of collection of the first set of statistical data and the second set of statistical data.

Each of the one or more data collecting devices 110 may be a mobile device. The mobile device is associated with a user that is responsible for collecting a portion of the first set of statistical data and the second set of statistical data. The mobile device is enabled with a camera, a keypad or keyboard, a global positioning system (GPS), text and data entry application and the like. The user assigned to collect the first set of statistical data and the second set of statistical data may use the mobile device to capture images and nameplate information of each of the plurality of energy consuming devices. In addition, the user may use the mobile device to schedule, record, identify, transfer or tag information related to the identity, usage and location of the plurality of energy consuming devices. The user may tag the images or any records with metadata for current and future analysis of the first set of statistical data and the second set of statistical data.

The mobile device may include one or more mobile applications that are configured to search and display the metadata associated with images and records, captured images, text and the like. The mobile device application installed with the one or more mobile applications may enable any user or any optical reader devices to capture key information about each analyzed energy consuming device. In addition, the metadata for captured images may be added later or remotely by any user.

The metadata and captured key information may be analyzed by an analysis tool of the prediction system 114. The metadata is sorted, categorized, prioritized and applied to calculations of probabilistic score and performance parameters of the built environment. The metadata and the captured key information in the form of first set of statistical data is used to display and generate charts, graphs, tables and other forms of data output. The generated results may be viewed and analyzed by any third party user present inside or outside of the built environment 102.

The prediction system 114 may transfer the analyzed data of the analysis engine to a manipulation engine. The manipulation engine enables display of organized results and the first set of statistical data on a presentation platform for recommendation and review of supervisors of the built environment 102.

Further, the prediction system 114 is associated with the plurality of external APIs 116. The plurality of external APIs 116 includes weather API 206a and utility history API 206b. The weather API 206a stores and collects a first data. The first data pertains to weather conditions surrounding the built environment 102. In addition, the utility history API 206b stores and collects a second data. The second data pertains to the past energy consumption data of the built environment 102.

In addition, the prediction system 114 collects the first set of statistical data associated with the plurality of energy consuming devices present in the built environment 102. The prediction system 114 accumulates the second set of statistical data associated with each of the plurality of users 104. Further, the prediction system 114 analyzes the first set of statistical data and the second set of statistical data. The prediction system 114 aggregates the current energy consumption data of the first set of statistical data for the plurality of energy consuming devices into pre-defined bins of time. The first set of statistical data and the second set of statistical data may be used to predict maximum energy consumption for pre-defined time bin. Each pre-defined time bin may be defined by a minute, half an hour, an hour and the like. The energy consumption for each of the plurality of energy consumption devices is aggregated for each pre-defined time bin. In addition, the aggregated and the collected energy consumption data is factored against one or more variables. The one or more variables include but may not be limited to data, time, temperature and pressure. For example, the temperature change in the ambience of the built environment may point to switch off or switch on state of the HVAC units. Further, the first set of statistical data and the second set of statistical data of each of the plurality of energy consuming devices may have some missing records for a certain period or instant of time. The missing records may generate errors in aggregate energy consumption for a specific time bin. The error may be minimized by imputing one or more missing data points for the specific time bin using local polynomial interpolation.

The energy usage model may be generated based on estimation of a residual standard deviation for each point of time. The maximum energy consumption may be derived by addition of a multiplication factor to the estimated residual standard deviation at each predicted point, to the mean of estimate for that predicted point. For example, the model for maximum temperature may be derived from computation of absolute values for the residual standard deviation of the energy usage model to obtain absolute residual standard deviation. Further, a general linear model is fitted in the obtained absolute residual standard deviation. The prediction system 114 imputes one or more missing data points in an aggregated current energy consumption data by utilizing local polynomial interpolation. The prediction system 114 estimates a residual standard deviation of the aggregated current energy consumption data for each pre-defined bin of time. The first set of statistical data and the second set of statistical data are analyzed for determining a maximum consumption potential value of the built environment 102. The analysis of the first set of statistical data and the second set of statistical data generates a plurality of statistical results. The plurality of statistical results comprises one or more graphs, one or more charts, one or more tables and one or more statistical maps of the energy consumption as a function of duration of operations. In addition, the one or more statistical maps of the energy consumption as a function of base-load, variable load, the cost of the operations, energy efficiency, the temperature, humidity, daylight and the real time occupancy of the plurality of users 104.

The prediction system 114 predicts the set of predictions associated with the potential future energy consumption of each of the plurality of energy consuming devices. The prediction system adds a multiplication factor to an estimated residual standard deviation for each pre-defined bin of time. The set of predictions are predicted in the real time. the set of predictions comprises maximum energy consumption values for each pre-defined time bin being factored based on temperature, cost, a real time occupancy pattern, a date and a time period associated with operation of each of the plurality of energy consuming devices, unusual and unexpected energy behaviors in the energy consumption of each of the plurality of energy consuming devices, the correlation of energy demand and the energy consumption pertaining to the built environment.

The prediction system 114 updates the first set of statistical data and the second set of statistical data (as elaborated below in the detailed description of the FIG. 3). Also, the prediction system 114 stores the first set of statistical data, the second set of statistical data, the plurality of statistical results and the set of predictions. In addition, the prediction system 114 displays the first set of statistical data, the second set of statistical data, the plurality of statistical results and the set of predictions on the one or more statistical monitoring devices 118. Examples of the one or more statistical monitoring devices 118 include the mobile phone, the laptop, the PDA and the like.

Figure 3:
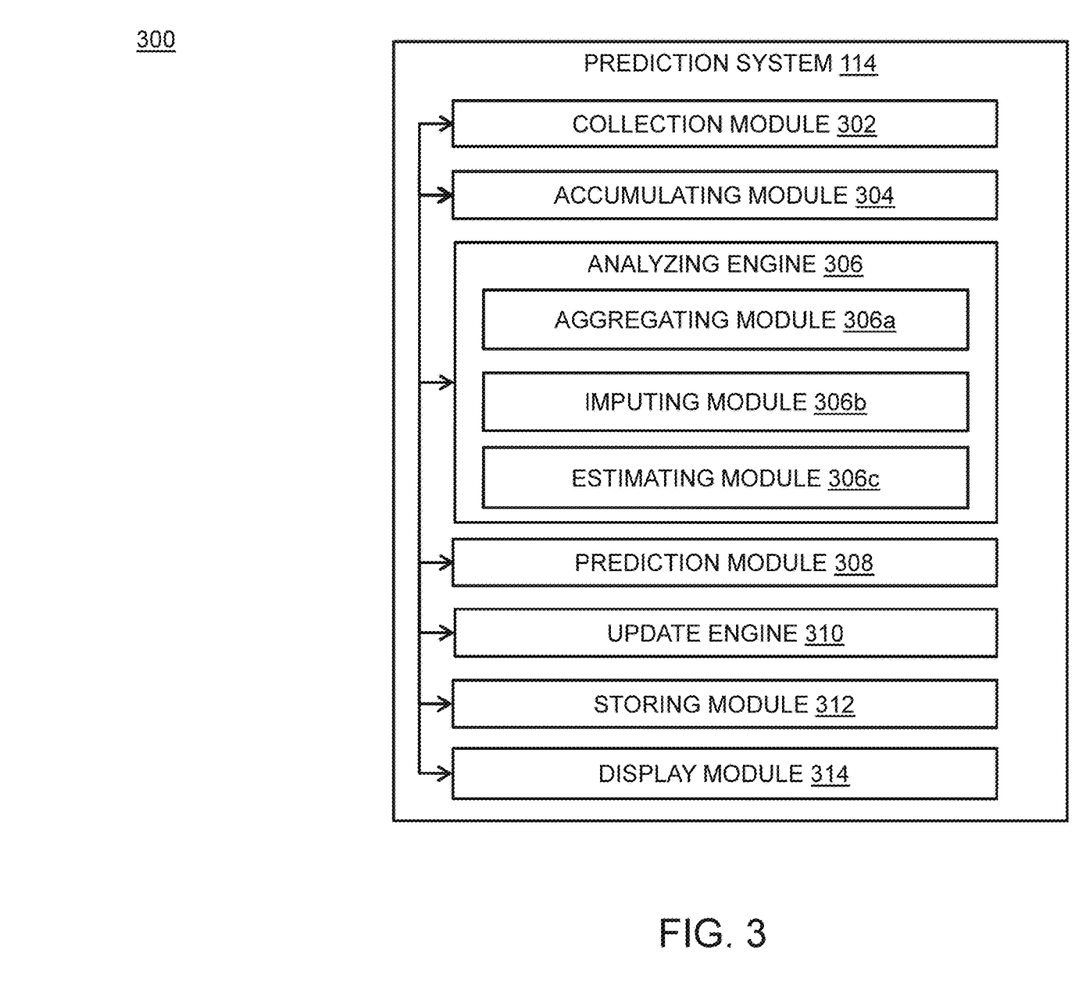
FIG. 3 illustrates a block diagram of a prediction system, in accordance with various embodiments of the present disclosure.

FIG. 3 illustrates a block diagram 300 for predicting the potential future energy consumption of the plurality of energy loads in the built environment, in accordance with various embodiments of the present disclosure. It may be noted that to explain the system elements of FIG. 3, references will be made to the system elements of the FIG. 1 and the FIG. 2. Further, the block diagram 300 includes the prediction system 114. The prediction system 114 includes a collection module 302, an accumulating module 304, an analyzing engine 306, a prediction module 308, an update engine 310, a storing module 312 and a display module 314. Further, the collection module 302 collects the first set of statistical data associated with the plurality of energy consuming devices present in the built environment 102. The collection is performed by gathering the current energy consumption data associated with each of the plurality of energy consuming devices. In addition, the collection is performed by collecting the past energy consumption data associated with the each of the plurality of energy consuming devices.

Further, the collection module 302 collects the first set of statistical data based on the first plurality of parameters. Also, the collection is performed in the real time. The first plurality of parameters includes the first plurality of parameters includes the current energy consumption data. The current energy consumption pertains to each of the plurality of energy consuming devices. Further, the first plurality of parameters includes a physical location and the duration of the energy usage by each of the plurality of energy consuming devices in the built environment 102. Furthermore, the plurality of parameters includes a seasonal variation in the energy consumption and an off-seasonal variation in the energy consumption.

Furthermore, the accumulating module 304 is configured to accumulate the second set of statistical data associated with each of the plurality of users 104 present inside the built environment 104. Moreover, the accumulating module 304 accumulates the second set of statistical data based on the second plurality of parameters. Also, the accumulation is performed in the real time. The second plurality of parameters includes the occupancy behavior and an energy consuming pattern associated with a corresponding energy consuming device associated with each of the plurality of users 104. In addition, the second plurality of parameters includes a physical location of the each of the plurality of users 104. Further, the second plurality of parameters include the duration of the energy usage associated with the corresponding energy consuming device associated with each of the plurality of users 104 present in the built environment 102.

Moreover, the analyzing engine 306 analyzes the first set of statistical data and the second set of statistical data. The analyzing engine 306 includes an aggregating module 306a, an imputing module 306b and an estimating module 306c. The aggregating module 306a aggregates the current energy consumption data of the first set of statistical data for the plurality of energy consuming devices into pre-defined bins of time (as discussed in detailed description of FIG. 2). The imputing module 306b imputes the one or more missing data points in an aggregated current energy consumption data by utilizing local polynomial interpolation (as discussed in detailed description of FIG. 2). Further, the estimation module 306c estimates the residual standard deviation of the aggregated current energy consumption data for each pre-defined bin of time (as discussed in detailed description of FIG. 2).

The analysis is performed to determine the maximum consumption potential value for the energy consumption inside the built environment 102. The one or more statistical functions generate the plurality of statistical results and the analyzing is done in the real time. The plurality of statistical results includes one or more graphs, one or more charts, one or more tables and one or more statistical maps of the energy consumption as a function of duration of the operations. Further, the plurality of statistical results includes base-load, variable load, the cost of the operations, energy efficiency, the temperature, humidity and daylight. Furthermore, the plurality of statistical results includes the real time occupancy of the plurality of users 104 inside the built environment 102 and physical parameters of each of the plurality of energy consuming devices. Moreover, the analysis is performed in the real time. Further, the analyzing module 306 utilizes the algorithm to detect word and number characters and reduces the first set of statistical data and the second set of statistical data.

In addition, the analyzing module 306 analyzes the images associated with each of the plurality of energy consuming devices with the first set of statistical data and the second set of statistical data. The analysis is performed to identify the type of the corresponding energy consumption device, the model and the manufacturer. The analyzing module 306 stores the information associated with each of the plurality of energy consuming devices. The information of the plurality of energy consuming devices may help in future to recognize the plurality of energy consuming devices. The analyzing module 306 is the self-learning module that speeds up the collection of the first set of statistical data and the second set of statistical data. The collection speeds up by auto fulfilling the data entry points of recognized devices.

Moreover, the prediction module 308 the set of predictions associated with the potential future energy consumption of each of the plurality of energy consuming devices. The prediction module adds the multiplication factor to an estimated residual standard deviation for each pre-defined bin of time. The set of predictions is provided to each of the plurality of users 104 to prompt each of the plurality of users 104 to take the one or more actions. The one or more actions are taken to control the energy consumption.

The set of predictions includes a maximum energy consumption values for each pre-defined bin of time that is factored based on temperature, cost and the real time occupancy pattern. Further, the set of predictions includes a time period associated with the plurality of energy consuming devices and identifying unusual energy behaviors in the energy consumption of the plurality of energy consuming devices. Furthermore, the set of predictions includes unexpected energy behaviors in the energy consumption of each of the plurality of energy consuming devices. Also, the set of predictions includes a correlation of energy demand and the energy consumption pertaining to one or more built environments.

Moreover, the set of predictions pertains to the future energy consumption. The set of predictions is based on the temperature, the weather conditions and the usage pattern. For example, the temperature reference is adjusted for the average temperature during the month of the July. The prediction method enables display of the change in the predicted use of the energy for the month of the July based on the temperature forecast. In addition, the average temperature based on the specific hour, specific day and specific month of the year is derived. The average temperature can be used to set the temperature reference. Moreover, the prediction method enables the display of the energy usage for the specific hour, the specific day or the specific month of the year. In another example, the operating behavior of the specific device may be changed based on an adjustment of the occupancy patterns in the buildings and the operation use of the device.

In addition, the prediction module 308 performs a reverse mathematical calculation with an appropriate energy consumption per given temperature. Further, the prediction module 308 accurately predicts the energy usage of built environment 102 based on hourly, daily, weekly, monthly or some other time period. Moreover, the set of predictions is based on the temperatures, the climate conditions and the usage patterns of each of the plurality of energy consuming devices present in the built environment 102. Further, the set of predictions suggests the energy consumption based on the time spent by the plurality of users 104 on an average per month.

Further, the prediction module 308 suggests the energy consumption based on the time the occupants spends on the average per month, or perhaps during the specific given month. In yet another example, the prediction method suggests installation of the control system to automatically adjust the interior lighting or the air conditioning based on the real-time occupancy. The real-time occupancy control system reduces the operating time of the lights and the air conditioning earlier left running for 24 hours. The prediction module 316 suggests another method to collect each of the plurality of the results associated with a statistical probability model, the base-load, the variable load and adjustments in the predictions to compare against cost of implementation.

Moreover, the predicted suggestions of the prediction module 314 are compared against the cost to implement measures having best potential return to managers of the built environment 102. The prediction module 314 influences the statistical probability model of the energy consumption pertaining to the built environment 102 to a high degree of the accuracy by lowering the energy consumption and the demand down to the single energy load sources. In addition, the prediction module 314 enables a prompt delivery of the plurality of statistical results and the set of predictions pertaining to the energy prediction system.

Further, the updating module 310 updates the first set of statistical data, the second set of statistical data, the plurality of statistical results and the set of predictions. The plurality of statistical results includes one or more graphs and one or more charts. In addition, the plurality of statistical results includes one or more tables and one or more statistical maps of the energy consumption as a function of duration of the operations. Further, the plurality of statistical results includes base-load, variable load, the cost of the operations, energy efficiency, the temperature, humidity and daylight. The plurality of statistical results includes the real time occupancy of the plurality of users inside the built environment and physical parameters of each of the plurality of energy consuming devices.

Moreover, the storing module 312 stores the first set of statistical data, the second set of statistical data, the plurality of statistical results and the set of predictions. Going further, the display module 314 display the first set of statistical data and the second set of statistical data on one or more statistical monitoring devices. In addition, the display module displays the plurality of statistical results and the set of predictions on the one or more statistical monitoring devices.

Figure 4:
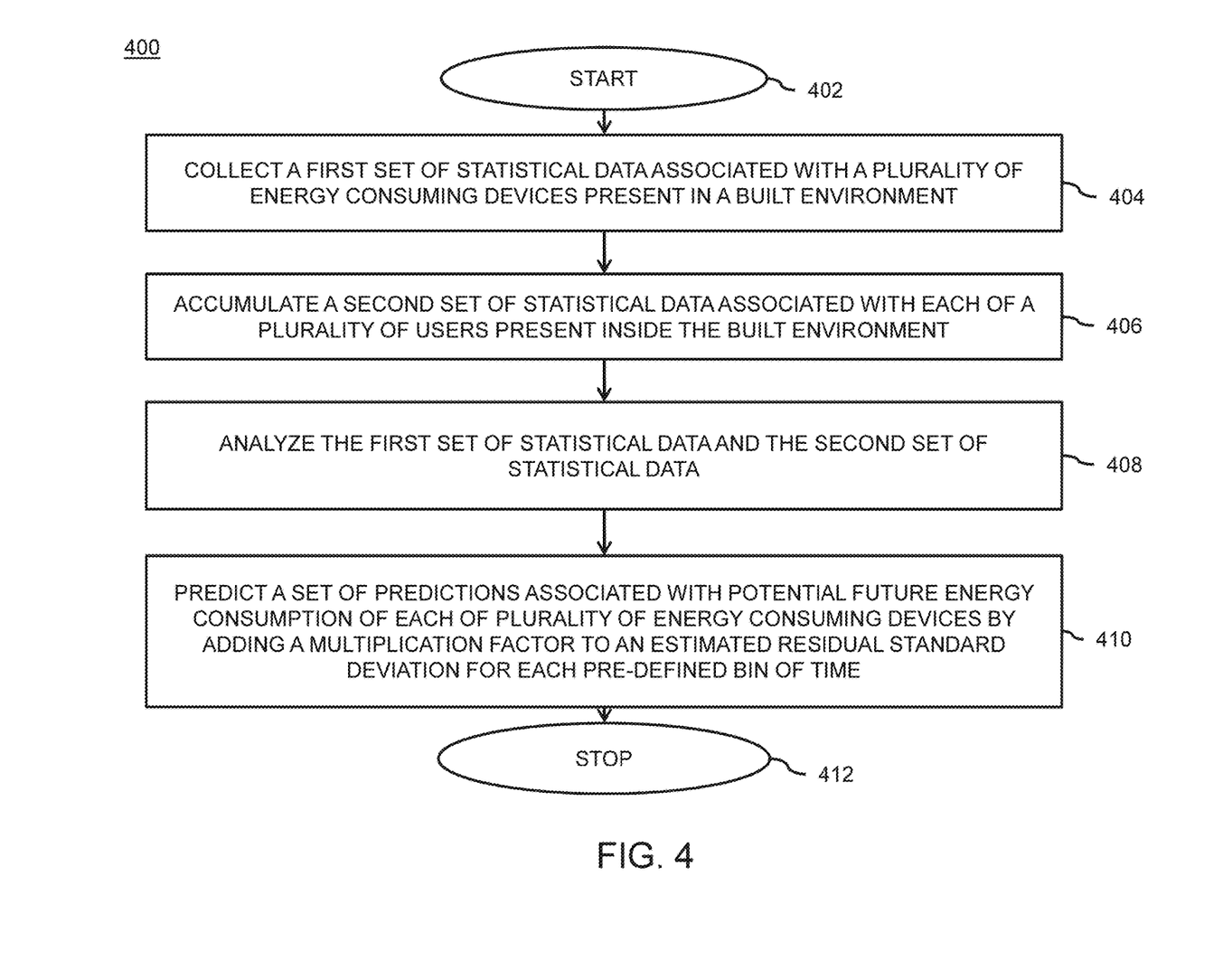
FIG. 4 illustrates a flow chart for predicting the potential future energy consumption of the plurality of energy loads in the built environment, in accordance with various embodiments of the present disclosure.

FIG. 4 illustrates a flow chart 400 for predicting the potential future energy consumption of the plurality of energy loads in the built environment, in accordance with various embodiments of the present disclosure. It may be noted that to explain the process steps of flowchart 400, references will be made to the system elements of FIG. 1, FIG. 2 and FIG. 3. It may also be noted that the flowchart 400 may have lesser or more number of steps.

The flowchart 400 initiates at step 402. Following step 402, at step 404, the collection module 302 collects the first set of statistical data associated with the plurality of energy consuming devices present in the built environment 102. At step 406, the accumulation module 304 accumulates the second set of statistical data associated with each of the plurality of users 104 present inside the built environment 102. At step 408, the analysing engine 306 analyzes the first set of statistical data and the second set of statistical data. At step 410, the prediction module 308 predicts the set of predictions associated with the potential future energy consumption of each of the plurality of energy consuming devices. The prediction module 308 adds the multiplication factor to the estimated residual standard deviation for each pre-defined bin of time. The prediction is performed based on the analysis of the first set of statistical data and the second set of statistical data. The flow chart 400 terminates at step 412.

Figure 5:
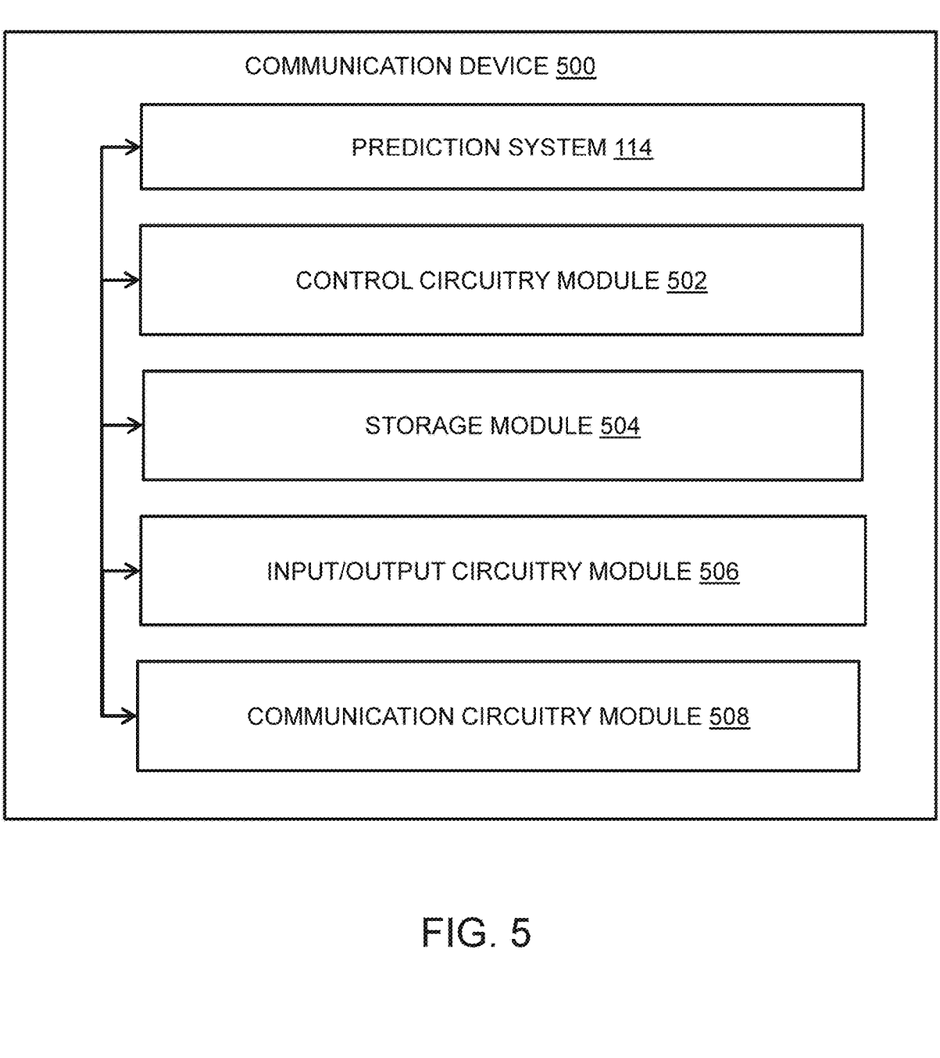
FIG. 5 illustrates a block diagram of a communication device, in accordance with various embodiments of the present disclosure.

FIG. 5 illustrates a block diagram of a communication device 500, in accordance with various embodiments of the present disclosure. The communication device 500 enables host process of the prediction system 114. The communication device 500 includes a control circuitry module 502, a storage module 504, an input/output circuitry module 506, and a communication circuitry module 508. The communication device 500 includes any suitable type of portable electronic device. The communication device 500 includes but may not be limited to a personal e-mail device (e.g., a Blackberry™ made available by Research in Motion of Waterloo, Ontario), a personal data assistant ("PDA"), a cellular telephone. In addition, the communication device 500 includes a smartphone, the laptop, computer and the tablet. In another embodiment of the present disclosure, the communication device 500 can be a desktop computer.

From the perspective of this disclosure, the control circuitry module 502 includes any processing circuitry or processor operative to control the operations and performance of the communication device 500. For example, the control circuitry module 502 may be used to run operating system applications, firmware applications, media playback applications, media editing applications, or any other application.

In an embodiment of the present disclosure, the control circuitry module 502 drives a display and process inputs received from the user interface. From the perspective of this disclosure, the storage module 504 includes one or more storage mediums. The one or more storage medium includes a hard-drive, solid state drive, flash memory, permanent memory such as ROM, any other suitable type of storage component, or any combination thereof. The storage module 504 may store, for example, media data (e.g., music and video files), application data (e.g., for implementing functions on the communication device 500).

From the perspective of this disclosure, the I/O circuitry module 506 may be operative to convert (and encode/decode, if necessary) analog signals and other signals into digital data. In an embodiment of the present disclosure, the I/O circuitry module 506 may convert the digital data into any other type of signal and vice-versa. For example, the I/O circuitry module 506 may receive and convert physical contact inputs (e.g., from a multi-touch screen), physical movements (e.g., from a mouse or sensor), analog audio signals (e.g., from a microphone), or any other input. The digital data may be provided to and received from the control circuitry module 502, the storage module 504, or any other component of the communication device 500.

It may be noted that the I/O circuitry module 506 is illustrated in FIG. 5 as a single component of the communication device 500; however those skilled in the art would appreciate that several instances of the I/O circuitry module 506 may be included in the communication device 500.

The communication device 500 may include any suitable interface or component for allowing the user to provide inputs to the I/O circuitry module 506. The communication device 500 may include any suitable input mechanism. Examples of the input mechanism include but may not be limited to a button, keypad, dial, a click wheel, and a touch screen. In an embodiment, the communication device 500 may include a capacitive sensing mechanism, or a multi-touch capacitive sensing mechanism.

In an embodiment of the present disclosure, the communication device 500 may include specialized output circuitry associated with output devices such as, for example, one or more audio outputs. The audio output may include one or more speakers built into the communication device 500, or an audio component that may be remotely coupled to the communication device 500.

The one or more speakers can be mono speakers, stereo speakers, or a combination of both. The audio component can be a headset, headphones or ear buds that may be coupled to the communication device 500 with a wire or wirelessly.

In an embodiment, the I/O circuitry module 506 may include display circuitry for providing a display visible to a user. For example, the display circuitry may include a screen (e.g., an LCD screen) that is incorporated in the communication device 500.

The display circuitry may include a movable display or a projecting system for providing a display of content on a surface remote from the communication device 500 (e.g., a video projector). In an embodiment of the present disclosure, the display circuitry may include a coder/decoder to convert digital media data into the analog signals. For example, the display circuitry may include video Codecs, audio Codecs, or any other suitable type of Codec.

The display circuitry may include display driver circuitry, circuitry for driving display drivers or both. The display circuitry may be operative to display content. The display content can include media playback information, application screens for applications implemented on the electronic device, information regarding ongoing communications operations, information regarding incoming communications requests, or device operation screens under the direction of the control circuitry module 502. Alternatively, the display circuitry may be operative to provide instructions to a remote display.

In addition, the communication device 500 includes the communication circuitry module 508. The communication circuitry module 508 may include any suitable communication circuitry operative to connect to a communication network. In addition, the communication circuitry module 508 may include any suitable communication circuitry to transmit communications (e.g., voice or data) from the communication device 500 to other devices. The other devices exist within the communications network. The communications circuitry 508 may be operative to interface with the communication network through any suitable communication protocol. Examples of the communication protocol include but may not be limited to Wi-Fi, Bluetooth®, radio frequency systems, infrared, LTE, GSM, GSM plus EDGE, CDMA, and quadband.

In an embodiment, the communications circuitry module 508 may be operative to create a communications network using any suitable communications protocol. For example, the communication circuitry module 508 may create a short-range communication network using a short-range communications protocol to connect to other devices. For example, the communication circuitry module 508 may be operative to create a local communication network using the Bluetooth,® protocol to couple the communication device 500 with a Bluetooth,® headset.

It may be noted that the computing device is shown to have only one communication operation; however, those skilled in the art would appreciate that the communication device 500 may include one more instances of the communication circuitry module 508 for simultaneously performing several communication operations using different communication networks. For example, the communication device 500 may include a first instance of the communication circuitry module 508 for communicating over a cellular network, and a second instance of the communication circuitry module 508 for communicating over Wi-Fi or using Bluetooth®.

In an embodiment of the present disclosure, the same instance of the communications circuitry module 508 may be operative to provide for communications over several communication networks. In another embodiment of the present disclosure, the communication device 500 may be coupled to a host device for data transfers and sync of the communication device 500. In addition, the communication device 500 may be coupled to software or firmware updates to provide performance information to a remote source (e.g., to providing riding characteristics to a remote server) or performing any other suitable operation that may require the communication device 500 to be coupled to the host device. Several computing devices may be coupled to a single host device using the host device as a server. Alternatively or additionally, the communication device 500 may be coupled to the several host devices (e.g., for each of the plurality of the host devices to serve as a backup for data stored in the communication device 500).

The purpose of described prediction system is to solve many of the problems to ease finance and bank energy improvements as a financial or cash based stream, security, investment or other finance mechanism. The energy prediction system achieves smaller investments for an improved behavior. The improvements identify and implement a high degree of accuracy at a low cost. By doing so, all of related parties, the built environment, owners, the operators, the occupants and finance vehicles, the banks, funds and companies involved in selecting, implementing, operating and maintaining the improvements can realize intended gains with a low degree of risk at the low cost. The intended gain can be made in the efficiency of the energy consumptions in existing built environments of all types, sizes, locations and the use.

Further, the efficient potential energy consumption prediction system addresses high costs associated with scaled load. The cost reductions for developing the statistical energy model comes from the segregation of on-site and off-site statistical data collected. Accordingly, different built environments that are metered and billed on a common energy utility account are grouped together to form an aggregation of the loads. In addition, the different built environment facilities are mapped out for future statistical analysis across the different built environments, the locations and the uses.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

While several possible embodiments of the invention have been described above and illustrated in some cases, it should be interpreted and understood as to have been presented only by way of illustration and example, but not by limitation. Thus, the breadth and scope of a preferred embodiment should not be limited by any of the above-described exemplary embodiments.

What is claimed:

1. A method for predicting a potential future energy consumption of a plurality of energy loads in a built environment, the method comprising:
   collecting, at one or more collecting devices via a plurality of sensors, a first set of statistical data including a location, current energy consumption data, and past energy consumption data of a plurality of energy consuming devices present in the built environment based on a plurality of factors including current, voltage, power, thermal loss, device size, power rating, and duration of use for each of the plurality of electrical devices;
   accumulating, at the one or more collecting devices, a second set of statistical data including a measure of usage patterns of the plurality of energy consuming devices and a physical location of a plurality of users present inside the built environment and operating the plurality of energy consuming devices;

analyzing the first set of statistical data and the second set of statistical data, by a prediction system having one or more processors and communicatively coupled to the one or more sensors, to determine a maximum consumption potential value of the built environment and generate a plurality of statistical results of energy consumption as a function of duration of operations and temperature, wherein the analyzing includes, by the one or more processors, aggregating the current energy consumption data of the first set of statistical data for the plurality of energy consuming devices into pre-defined bins of time to generate aggregated current energy consumption data, imputing one or more missing data points in the aggregated current energy consumption data by utilizing local polynomial interpolation, and estimating a residual standard deviation of the aggregated current energy consumption data for each pre-defined bin of time; and displaying, by the prediction system, a visible output to a user indicating the future energy consumption of each of the plurality of energy consuming devices.

2. The method as recited in claim 1, further comprising:
determining a set of predictions associated with maximum energy consumption for pre-defined bin of time; and
updating the first set of statistical data, the second set of statistical data, the plurality of statistical results and the set of predictions.

3. The method as recited in claim 2, further comprising storing the first set of statistical data, the second set of statistical data, the plurality of statistical results and the set of predictions.

4. The method as recited in claim 2, wherein the set of predictions comprises maximum energy consumption values for each pre-defined bin of time being factored based on temperature, cost, a real time occupancy pattern, a date and a time period associated with operation of each of the plurality of energy consuming devices, unusual and unexpected energy behaviors in the energy consumption of each of the plurality of energy consuming devices, the correlation of energy demand and the energy consumption pertaining to the built environment.

5. The method as recited in claim 1, further comprising displaying the first set of statistical data, the second set of statistical data, the plurality of statistical results and the set of predictions on one or more statistical monitoring devices.

6. The method as recited in claim 1, wherein the plurality of statistical results comprises one or more graphs, one or more charts, one or more tables and one or more statistical maps of the energy consumption as a function of duration of operations, base-load, variable load, the cost of the operations, energy efficiency, the temperature, humidity, daylight, the real time occupancy of the plurality of users inside the built environment and physical parameters of each of the plurality of energy consuming devices.

7. The method as recited in claim 1, wherein the collection being done by the one or more sensors located in the built environment.

8. The method as recited in claim 1, wherein the first plurality of parameters comprises the current energy consumption data pertaining to each of the plurality of energy consuming devices, physical location of each of the plurality of energy consuming devices present in the built environment, the duration of the energy usage by each of the plurality of energy consuming devices, a seasonal variation in the energy consumption and an off-seasonal variation in the energy consumption.

9. The method as recited in claim 1, wherein the second plurality of parameters comprises an occupancy behavior of the plurality of users, an energy consuming pattern associated with a corresponding energy consuming device associated with each of the plurality of users, the physical location of the each of the plurality of users and the duration of the energy usage associated with the corresponding energy consuming device associated with each of the plurality of users present in the built environment.

10. The method as recited in claim 1, wherein the past energy consumption data and weather conditions being obtained from a plurality of sources and wherein the plurality of sources comprises a plurality of external application programming interfaces and third party databases.

11. A computer system for predicting a potential future energy consumption of a plurality of energy loads in a built environment, the computer system comprising:
a memory for storing instructions;
a data collecting device associated with a plurality of sensors coupled to the memory and configured to
collect, via the plurality of sensors, a first set of statistical data including a location, current energy consumption data, and past energy consumption data of a plurality of energy consuming devices present in the built environment based on a plurality of factors including current, voltage, power, thermal loss, device size, power rating, and duration of use for each of the plurality of electrical devices, and
accumulate, at the collecting device, a second set of statistical data including a measure of usage patterns of the plurality of energy consuming devices and a physical location of a plurality of users present inside the built environment and operating the plurality of energy consuming devices,
analyze the first set of statistical data and the second set of statistical data to determine a maximum consumption potential value of the built environment and generate a plurality of statistical results of energy consumption as a function of duration of operations and temperature, wherein the analyzing includes,
aggregating the current energy consumption data of the first set of statistical data for the plurality of energy consuming devices into pre-defined bins of time to generate aggregated current energy consumption data,
imputing one or more missing data points in the aggregated current energy consumption data by utilizing local polynomial interpolation, and
estimating a residual standard deviation of the aggregated current energy consumption data for each pre-defined bin of time, and
displaying a visible output to a user indicating the potential future energy consumption of each of the plurality of energy consuming devices by adding a multiplication factor to an estimated residual standard deviation for each pre-defined bin of time, wherein the set of predictions being predicted in the real time.

12. The computer system as recited in claim 11, further comprising:
determining a set of predictions associated with maximum energy consumption for pre-defined bin of time; and updating the first set of statistical data, the second set of statistical data, the plurality of statistical results and the set of predictions.

13. The computer system as recited in claim 12, further comprising storing the first set of statistical data, the second set of statistical data, the plurality of statistical results and the set of predictions.

14. The computer system as recited in claim 12, wherein the set of predictions comprises maximum energy consumption values for each pre-defined bin of time being factored based on temperature, cost, a real time occupancy pattern, a date and a time period associated with operation of each of the plurality of energy consuming devices, unusual and unexpected energy behaviors in the energy consumption of each of the plurality of energy consuming devices, the correlation of energy demand and the energy consumption pertaining to the built environment.

15. The computer system as recited in claim 11, further comprising displaying the first set of statistical data, the second set of statistical data, the plurality of statistical results and the set of predictions on one or more statistical monitoring devices.

16. A computer-readable storage medium encoding computer executable instructions that, when executed by at least one processor, performs a method for predicting a potential future energy consumption of a plurality of energy loads in a built environment, the method comprising:
   collecting, collecting devices via a plurality of via a plurality of sensors of a data collecting device, a first set of statistical data including a location, current energy consumption data, and past energy consumption data of a plurality of energy consuming devices present in the built environment based on a plurality of factors including current, voltage, power, thermal loss, device size, power rating, and duration of use for each of the plurality of electrical devices;
   accumulating, via the plurality of sensors, a second set of statistical data including a measure of usage patterns of the plurality of energy consuming devices and a physical location of a plurality of users present inside the built environment and operating the plurality of energy consuming devices;
   analyzing the first set of statistical data and the second set of statistical data, by a prediction system communicatively coupled to the collecting device, to determine a maximum consumption potential value of the built environment and generate a plurality of statistical results of energy consumption as a function of duration of operations and temperature, wherein the analyzing includes
      aggregating the current energy consumption data of the first set of statistical data for the plurality of energy consuming devices into pre-defined bins of time to generate aggregated current energy consumption data,
      imputing one or more missing data points in the aggregated current energy consumption data by utilizing local polynomial interpolation, and
      estimating a residual standard deviation of the aggregated current energy consumption data for each pre-defined bin of time; and
   displaying, by a prediction system, a visible output to a user indicating the potential future energy consumption of each of the plurality of energy consuming devices by adding a multiplication factor to the estimated residual standard deviation for each pre-defined bin of time.

17. The computer-readable storage medium as recited in claim 16, further comprising instructions for:
   determining a set of predictions associated with maximum energy consumption for pre-defined bin of time; and
   updating the first set of statistical data, the second set of statistical data, the plurality of statistical results and the set of predictions.

18. The computer-readable storage medium as recited in claim 17, further comprising instructions for storing the first set of statistical data, the second set of statistical data, the plurality of statistical results and the set of predictions.

19. The computer-readable storage medium as recited in claim 17, further comprising instructions for displaying the first set of statistical data, the second set of statistical data, the plurality of statistical results and the set of predictions on one or more statistical monitoring devices.

20. The computer-readable storage medium as recited in claim 17, wherein the set of predictions comprises maximum energy consumption values for each pre-defined bin of time being factored based on temperature, cost, a real time occupancy pattern, a date and a time period associated with operation of each of the plurality of energy consuming devices, unusual and unexpected energy behaviors in the energy consumption of each of the plurality of energy consuming devices, the correlation of energy demand and the energy consumption pertaining to the built environment.

* * * * *